US010430844B1

(12) United States Patent
Wakeford et al.

(10) Patent No.: US 10,430,844 B1
(45) Date of Patent: Oct. 1, 2019

(54) SYSTEM AND METHOD FOR FACILITATING A GAME THROUGH A PRIMARY CLIENT DEVICE AND IN-GAME CONTENT PURCHASES THROUGH A MOBILE DEVICE

(71) Applicant: Aftershock Services, Inc., San Francisco, CA (US)

(72) Inventors: Kent Wakeford, Hillsborough, CA (US); Clifford J. Harrington, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 271 days.

(21) Appl. No.: 15/664,950

(22) Filed: Jul. 31, 2017

Related U.S. Application Data

(63) Continuation of application No. 13/791,668, filed on Mar. 8, 2013, now Pat. No. 9,721,284.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0601* (2013.01); *G06Q 30/0267* (2013.01); *G06Q 30/0251* (2013.01); *G06Q 30/06* (2013.01); *G06Q 30/0631* (2013.01); *G06Q 30/0641* (2013.01); *G06Q 30/0643* (2013.01)

(58) Field of Classification Search
CPC .............................................. G06Q 30/00–08
See application file for complete search history.

(56) References Cited

U.S. PATENT DOCUMENTS

| | | |
|---|---|---|
| 6,567,984 B1 | 5/2003 | Allport |
| 6,878,067 B2 | 4/2005 | Blanco |
| 7,047,030 B2 | 5/2006 | Forsyth |
| 7,194,754 B2 | 3/2007 | Tomsen |
| 7,580,005 B1 | 8/2009 | Palin |
| 7,637,813 B2 | 12/2009 | Katayama |
| 8,156,004 B2 | 4/2012 | Wajihuddin |
| 8,226,476 B2 | 7/2012 | Haltovsky |

(Continued)

OTHER PUBLICATIONS

Upgrade from one screen to two. The Straits Times; Singapore [Singapore] Jun. 13, 2012. Retrieved via ProQuest (Year: 2012).*

(Continued)

*Primary Examiner* — Michael Misiaszek
(74) *Attorney, Agent, or Firm* — Knobbe, Martens, Olson & Bear, LLP

(57) ABSTRACT

The disclosure relates to systems and methods for communicating a primary display comprising information that facilitates visual presentation of a view of a game space to a primary client device and facilitating purchases of content for use in the game through a secondary client device such as a user's smartphone. The system may include a game device that allows a user to play a video game or otherwise interact with a virtual environment using the primary client device and purchase content for use in the video game using a secondary client device while playing the video game using the primary client device. The purchased content may be integrated into the game space such that purchased content is available for use while the user is playing the video game.

10 Claims, 7 Drawing Sheets

(56) References Cited

U.S. PATENT DOCUMENTS

| | | |
|---|---|---|
| 8,270,641 B1 | 9/2012 | Greenberg |
| 8,282,490 B2 | 10/2012 | Arezina |
| 2002/0110246 A1 | 8/2002 | Gosior |
| 2003/0013527 A1 | 1/2003 | Rowe |
| 2003/0216181 A1 | 11/2003 | Danieli |
| 2006/0111188 A1 | 5/2006 | Winkler |
| 2007/0021192 A1 | 1/2007 | Tamimoto |
| 2007/0087831 A1 | 4/2007 | Van Luchene |
| 2007/0265073 A1 | 11/2007 | Novi |
| 2008/0026849 A1 | 1/2008 | Bird |
| 2008/0140536 A1 | 6/2008 | Ruiz Tejedor |
| 2008/0214273 A1 | 9/2008 | Snoddy |
| 2009/0098940 A1 | 4/2009 | Sangberg |
| 2009/0264190 A1 | 10/2009 | Davis |
| 2010/0056280 A1 | 3/2010 | Langan |
| 2010/0069158 A1 | 3/2010 | Kim |
| 2010/0099471 A1 | 4/2010 | Feeney |
| 2010/0178973 A1 | 7/2010 | Snoddy |
| 2010/0185721 A1 | 7/2010 | Merrifield |
| 2010/0267448 A1 | 10/2010 | Snoddy |
| 2011/0092271 A1 | 4/2011 | Nguyen |
| 2011/0143835 A1 | 6/2011 | Sizelove |
| 2012/0038742 A1 | 2/2012 | Robinson |
| 2012/0038827 A1 | 2/2012 | Davis |
| 2012/0059795 A1 | 3/2012 | Hersh |
| 2012/0220354 A1 | 8/2012 | Haltovsky |
| 2012/0249591 A1 | 10/2012 | Maciocci |
| 2012/0270646 A1 | 10/2012 | Walker |
| 2012/0304584 A1 | 12/2012 | Pan |
| 2013/0046781 A1 | 2/2013 | Frankel |
| 2013/0053144 A1 | 2/2013 | Nicely |
| 2013/0072308 A1 | 3/2013 | Peck |
| 2013/0246942 A1 | 9/2013 | Merrifield |
| 2013/0254680 A1 | 9/2013 | Buhr |
| 2014/0176534 A1 | 6/2014 | Vignocchi |

OTHER PUBLICATIONS

AMD Eyefinity Technology, http://www.amd.com/us/products/technologies/amd-eyefinity-technology/pages/eyefinity.a . . . , printed Feb. 13, 2013, 1 page.

Wii U Official Site—Built In Software, Nintendo, http://www.nintendo.com/wiiu/built-in-software/*/eshop, printed Feb. 16, 2013, 5 pages.

\* cited by examiner

SYSTEM AND METHOD FOR FACILITATING A GAME THROUGH A PRIMARY CLIENT DEVICE AND IN-GAME CONTENT PURCHASES THROUGH A MOBILE DEVICE

FIELD OF THE INVENTION

The disclosure relates to systems and methods for communicating a primary display comprising information that facilitates visual presentation of a view of a game space to a primary client device and facilitating purchases of content for use in the game through a mobile device.

BACKGROUND OF THE INVENTION

Video games and other applications that provide a virtual environment are increasingly using online shops that enable users to purchase content for use in the virtual environment. For example, some online shops allow users to purchase virtual items for use in a game. However, conventional shops may impose high transaction costs related to administering third party developers and processing payments. Conventional online shops are also inconvenient for the user because they are presented before or after a gameplay session, thus preventing the user from purchasing items during gameplay.

If presented during gameplay, the online shop would occupy at least a portion of a game display with which the user interacts to play the game. Occupying portions of the game display presents a number of concerns. In a multi-user environment, presenting the online shop in the game display may expose to other users real or virtual account information (e.g., real credit card numbers) used to complete the content purchase transaction. Furthermore, a user may not want another user to know purchase information such as identification, price paid, quantity, etc., related to the items being purchased. Whether multi-user or not, presenting the online shop in the game display may also obscure portions of the game space, leading to an unsatisfactory experience for the user.

SUMMARY OF THE INVENTION

The disclosure relates to systems and methods for communicating a primary display comprising information that facilitates visual presentation of a view of a game space to a primary client device and facilitating purchases of content for use in the game through a secondary client device such as a user's smartphone. The system may include a game device that allows a user to play a video game or otherwise interact with a virtual environment using the primary client device and purchase content for use in the video game using a secondary client device while playing the video game using the primary client device. The game device may communicate the primary display to the primary client device and communicate offers for content to the secondary client device at the same time. Thus, a given user may be presented with offers for content at, for example, the user's smartphone, while playing the video game through the primary client device.

The game device may be configured to coordinate the primary client device and the secondary client device such that gameplay and purchases made during gameplay are associated with the given user playing the game. In this manner, a user may control one or more graphical objects within the game space through the primary client device and purchase content using the secondary client device. As such, no portion of the primary display communicated to the primary client device is obscured with the offers for content and other users interacting with the primary display are not provided with the purchase information, keeping purchases of the given user private. The purchased content may be integrated into the game space such that purchased content is available for use while the user is playing the video game.

Coordination of the primary client device and the secondary client device may occur in various ways. By way of example only, the user may logon to a gameplay session via both the primary client device and the secondary client device. For example, the primary client device may include a computing device used to connect to the game device for playing an online game via a web browser or other application. The online game may include a FLASH-based game and/or other format of game. The secondary client device may include a smartphone programmed with an agent such as a mobile application that communicates with the game device for receiving offers from the game device and making content purchases to be incorporated into the game being played on the primary client device.

In some embodiments, the primary client device and/or the secondary client device may be pre-registered with the system such that the game device may recognize either or both devices. For example, upon logging onto the system to start a gameplay session using the primary client device, a connection with the secondary client device may automatically be established. Other configurations of primary client devices and secondary client devices may be used as described herein and as would be apparent to those skilled in the art based on this disclosure.

To facilitate purchases, the game device may maintain a user account of the user. The user account may include real and/or virtual financial account information such that purchases may be seamlessly provided when the user purchases content. The game device may also maintain an inventory of content that is offered for sale. By maintaining accounting information and content offered for sale, the system facilitates a lower transaction cost to administer sale of content purchases related to the game.

Once the primary and secondary client devices have been associated with one another, the game device may provide sale offers for content to the user at the secondary client device. The sale offers may be identified in various ways. For example, all content or content being promoted may be provided to the user. In some instances, the game device may identify content that may be relevant to the user based on user profile information, prior purchases, prior gameplay activity, past or current game events, and/or other information that may be used to obtain content in which the user may have an interest.

The game device may make the identifications of content for offering to the user at various times such as while the user is playing the game and/or when the user is not playing the game (e.g., has logged off or otherwise turned off the game device). The identifications made while the user is playing the game may facilitate real-time suggestions based on current game events and/or information known about the user. Identifications made while the user is not playing the game may be analyzed for later presentation to the user while the user is playing the game. Identifications made while the user is not playing the game may allow for more rigorous analysis of: (i) the user profile, (ii) gameplay of the user, and/or (iii) other information obtained about the user to identify content in which the user may be interested and stored for later retrieval such that the offers may be presented when the user is playing the game. In these instances, targeted offers may be made for the user when the user may be most interested in making a purchase such as while playing the game.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
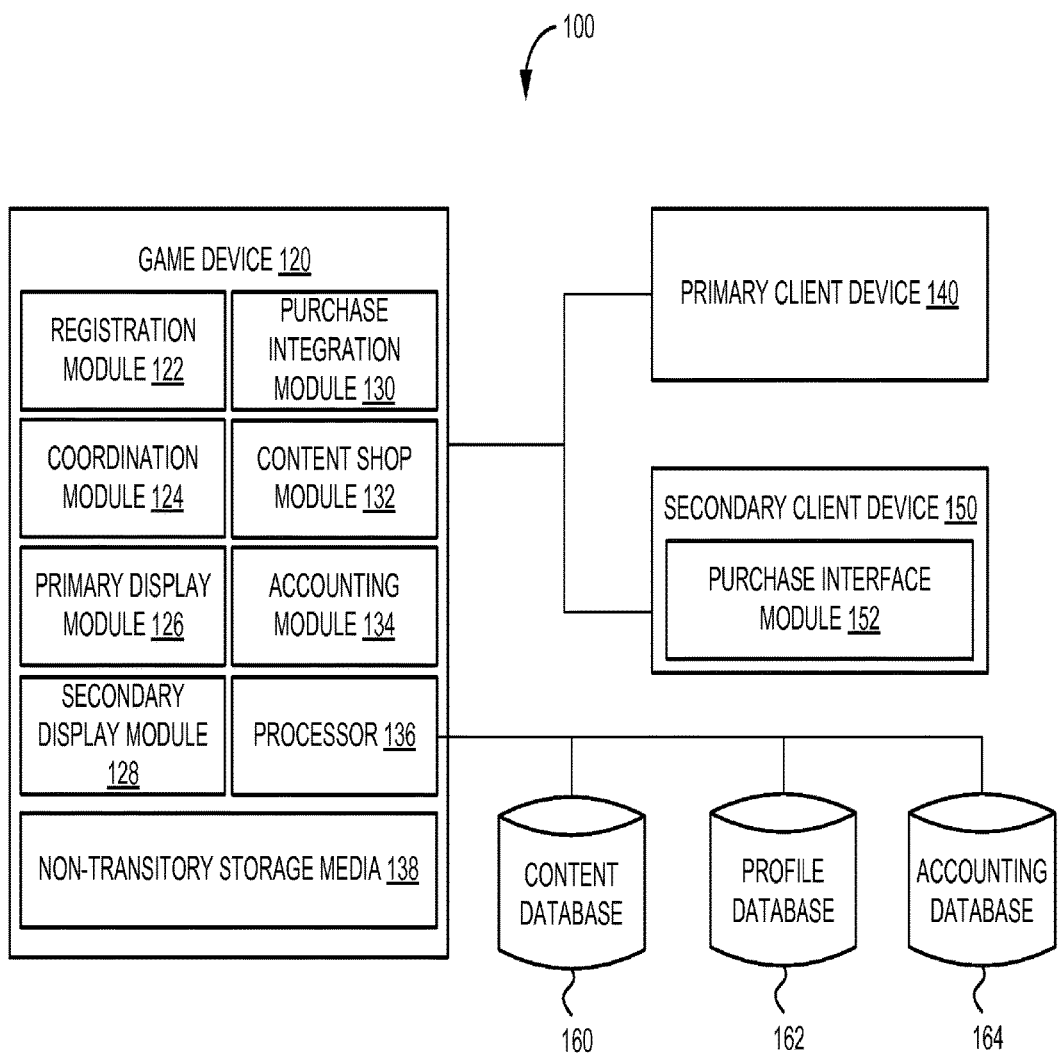
FIG. 1 illustrates a system configured to provide a primary display that includes a game space and a second display that facilitates sale of content while the game space is displayed via the primary display, according to an embodiment of the invention.

FIG. 1 illustrates a system 100 configured to provide a primary display that includes a game space and a secondary display that facilitates sale of content while the game space is displayed via the primary display, according to an embodiment of the invention. Content may include virtual items (e.g., soldiers, weapons, etc.), power-ups, virtual knowledge such as virtual technology, game episodes, game levels, and/or other content that can be purchased and used during gameplay.

System 100 may include a game device 120, a primary client device 140, a secondary client device 150, and/or other components. Although only a single game device 120, a single primary client device 140, and a single secondary client device 150 is illustrated in FIG. 1, other numbers of the foregoing devices may be used and other configurations of system 100 may be used, examples of which are illustrated in FIGS. 3A-3C and FIGS. 4A and 4B.

Game device 120 may include one or more processors 136 configured to execute one or more modules such as a registration module 122, a coordination module 124, a primary display module 126, a secondary display module 128, a purchase integration module 130, a content shop module 132, an accounting module 134, and/or other modules.

In some embodiments, registration module 122 may be configured to register a user with the system. For example, registration module 122 may obtain user information such as a name, age, game handle (e.g., virtual name), credential information (e.g., username, password, keys), and/or other information that describes the user and store the obtained user information in profile database 162.

To facilitate content purchases, registration module 122 may obtain user financial information such as credit card information and/or other account information used to pay for content and store the obtained financial information in accounting database 164. Accounting database 164 may also store virtual currency and/or other resources used to pay for content.

To facilitate use of secondary client device 150, registration module 122 may obtain an identification of the secondary client device. For example, in embodiments where the secondary client device 150 used by a user to make purchases includes the user's mobile device, registration module 122 may obtain an identification of the mobile device such as a Media Access Control address.

In some embodiments, coordination module 124 may be configured to coordinate the activities of primary display module 126 and secondary display module 128. For example, coordination module 124 may receive a logon, device identifier, and/or other identifying information from the user via primary client device 140 and/or secondary client device 150.

Coordination module 124 may be configured to manage communication between primary display module 126 and primary client device 140 for communicating a primary display generated by the primary display module. Likewise, coordination module 124 may manage communication between secondary display module 128 and secondary client device 150 for communicating a secondary display generated by the secondary display module.

Coordination module 124 may recognize that the user wishes to initiate a gameplay session using primary client device 140 and secondary client device 150 based on the identifying information received from primary client device

140 and secondary client device 150. Initiating the gameplay session may include joining an existing online game (e.g., a multi-user online game that operates whether or not a particular user is logged onto the game), initiating a new online game, hosting an online game, initiating a local game, and/or otherwise allowing the user to begin playing the game.

Accordingly, coordination module 124 may initiate and coordinate a gameplay session that is associated with a primary display communicated to primary client device 140 and a secondary display communicated to secondary client device 150. For example, a gameplay session identifier may be associated with identities of a user, primary client device 140, and/or secondary client device 150 such that information that facilitates visual presentation of a view of a game space may be communicated to primary client device 140 and sale offers for content may be communicated to secondary client device 150 during gameplay. By doing so, coordination module 124 may ensure that game device 120 is able to coordinate gameplay occurring via a primary display communicated to primary client device 140 and purchases occurring via a secondary display communicated to secondary client device 150.

Primary display module 126 may be configured to communicate information that facilitates visual presentation of a view of a game space to the user on primary client device 140. Responsive to the communicated information from primary display module 126, primary client device 140 may render the visual presentation of the game space such that the user can play the game.

In some embodiments, primary display module 126 may communicate game events such as user inputs from primary client device 140, inputs from other users in a multi-user game, actions resulting from the inputs, and/or other game events to other modules of game device 120, such as coordination module 124. In this manner, various modules of game device 120 may be updated with current game events and act accordingly, as described herein.

In some embodiments, secondary display module 128 may be configured to communicate one or more selectable sale offers for presentation during the game to the user at secondary client device 150. The selectable sale offers may offer content that may be acquired and used in the game. The secondary display module 128 may receive, from secondary client device 150, an indication to purchase content being offered for sale during the game. Responsive to the indication, secondary display module 128 may cause the content to be provided to the user for use in the game.

In some embodiments, secondary display module 128 may be configured to receive a request to purchase content from secondary client device 150 without first offering content. In these embodiments, for example, secondary client device 150 may display a fillable request form that the user may use to input an indication of content to be purchased.

In some embodiments, purchase integration module 130 may be configured to integrate the purchased content into the game. The purchased content may be integrated into the game during the game such that communication of the game space for visual presentation of the game to the user on primary client device 140 incorporates the purchased content. For example, when the content includes a virtual item or power-up, the virtual item may be made available for use by the user in the game space displayed on primary client device 140. When the content includes an additional level, the additional level may be provided for gameplay on primary client device 140. Other types of content may be purchased and incorporated into the game as well.

In some embodiments, accounting module 134 may be configured to debit a user account stored in accounting database 164. The user account may store user account information such as real financial account information, virtual financial account information, and/or other information related to resources that can be used in exchange for purchased content. When using real financial account information, accounting module 134 may cause a real payment to be processed via conventional payment processing networks (not illustrated in FIG. 1) such as credit card processing networks, PAYPAL, and/or other payment processing networks. When using virtual resources such as virtual currency, accounting module 134 may debit a balance of the user account having virtual resources. Accounting module 134 may also use any combination of real and/or virtual resources to facilitate payment of the purchase.

The user account may be arranged such that upon logon to the system via, for example, secondary client device 150, the user may make purchases without having to provide the user account information when making purchases during gameplay. By processing the payments directly and managing payments during gameplay, the system may reduce transaction costs associated with third party developers and provide a seamless gameplay experience for the user making content purchases during the game.

In some embodiments content shop module 132 may be configured to identify offers for content to be made available for communication by secondary display module 128. An individual offer may include an offer for a quantity of content (e.g., a number of virtual items), a combination of different types of content (e.g., a combination of virtual items), an episode or game level, a power-up, a health recharge, and/or other content that may be used in the game. In some embodiments, an individual offer may include an offer for one or more real-world items and/or combination of a real-world item and content that is used in the game. The real or virtual content offered for sale may be stored in and obtained from content database 160.

Content shop module 132 may identify offers in various ways. For example, content shop module 132 may simply provide all content that is available for sale for the relevant game. The content may be stored in content database 160. In some embodiments, content shop module 132 may obtain a user profile associated with a user playing a game during a game session. Content shop module 132 may suggest/identify content in which the user may be interested based on the user profile. For example, the user profile may indicate that the user belongs to a demographic that prefers certain game levels over others and therefore such levels should be targeted for the user. The user profile may also include prior gameplay or purchase histories such that a style of gameplay or previous purchases of the user may indicate a propensity to use and/or otherwise have interest in certain types of content than others. Other information obtained about the user from the user profile may be used to tailor offers for the user for communication to secondary client device 150 during gameplay.

In some embodiments, if known, profiles of contacts may similarly be used to target offers to the user. For example, a user profile of a social media or other contact of the user may be used to target offers to the user.

In some embodiments, content shop module 132 may be configured to identify offers based on content that is being promoted or is otherwise on sale. Such sale offers may include discounted pricing, buy one get one free, combination offers that include more than one type of content, bonus content, mystery content, and/or other types of promotions that may be used to incentivize purchase.

In some embodiments, content shop module 132 may be configured to identify offers for content based on current game events. As previously described, primary display module 126 may communicate game events to other modules of game device 120. For example, primary display module 126 may provide game events to content shop module 132 such that content shop module 132 determines offers responsive to the game events. Based on the game events, content shop module 132 may make suggestions on potentially useful content, given the current state of the game for the user. For example, suggestions and offers for content may be based on other users' actions (in a multi-user game), repeat failed attempts to accomplish a task such as defeat an enemy, and/or other current game events.

In some embodiments, content shop module 132 may make the identifications of content for offering to the user at various other times such as when the user is not playing the game (e.g., has logged off or otherwise turned off game device 120). The identifications made while the user is playing the game may facilitate real-time suggestions based on current game events and/or information known about the user. On the other hand, identifications made while the user is not playing the game may be analyzed for later presentation to the user while the user is playing the game. Identifications made while the user is not playing the game may allow for more rigorous analysis of the user profile, other information obtained about the user and/or gameplay of the user to identify content in which the user may be interested. The identified offers may be stored for later retrieval such that the offers may be presented when the user is playing the game. As such, targeted offers may be made for the user when the user may be most interested in making the purchase such as when playing the game.

Content shop module 132 may identify offers for content based on a combination of the foregoing and/or other information that may be indicative of content that may be of interest to the user. For example, content shop module 132 may take into account user profile information, user profile information of the user's contacts, current game events, previous game events, promotions/sales, and/or other information.

The primary display may be communicated to and displayed by a primary client device 140 and the secondary display may be communicated to and displayed by a secondary client device 150. Primary client device 140 may include a computing device, a monitor, an input device, and/or other devices that allow viewing and/or interaction with the game. Secondary client device may include a generally portable computing device such as a cellular device, a tablet computing device, and/or other generally portable computing device that is configured to receive offers and make purchases via the secondary display during gameplay.

The components illustrated in FIG. 1 may be communicably coupled to one another via various communication links. The communication links may include wired or wireless connections. In some embodiments, the communication links may include a network connection that includes any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The databases 160, 162, and 164 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Those having skill in the art will recognize that primary client device 140 and secondary client device 150 may each comprise one or more processors, one or more interfaces (to various peripheral devices or components), non-transitory storage media, and/or other components coupled via a bus. The non-transitory storage media, such as non-transitory storage media 138 of game device 120 and non-transitory storage media of primary client device 140 (not illustrated) and non-transitory storage media of secondary client device 150 (not illustrated), may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

In some embodiments, one or more processors (not illustrated in FIG. 1) of secondary client device 150 may be programmed with an agent such as purchase interface module 152. Purchase interface module 152 may facilitate communication with game device 120 and in particular with secondary display module 128. For example, purchase interface module 152 may be configured to facilitate a logon process with game device 120 and/or otherwise indicate that the user operation secondary client device 150 is ready to receive offers for content.

Purchase interface module 152 receive selectable sale offers from secondary display module 128, display the selectable sale offers for presentation to the user, receive a selection of one or more of the selectable sale offers from the user, and communicate an indication of the selection to game device 120.

Figure 2:
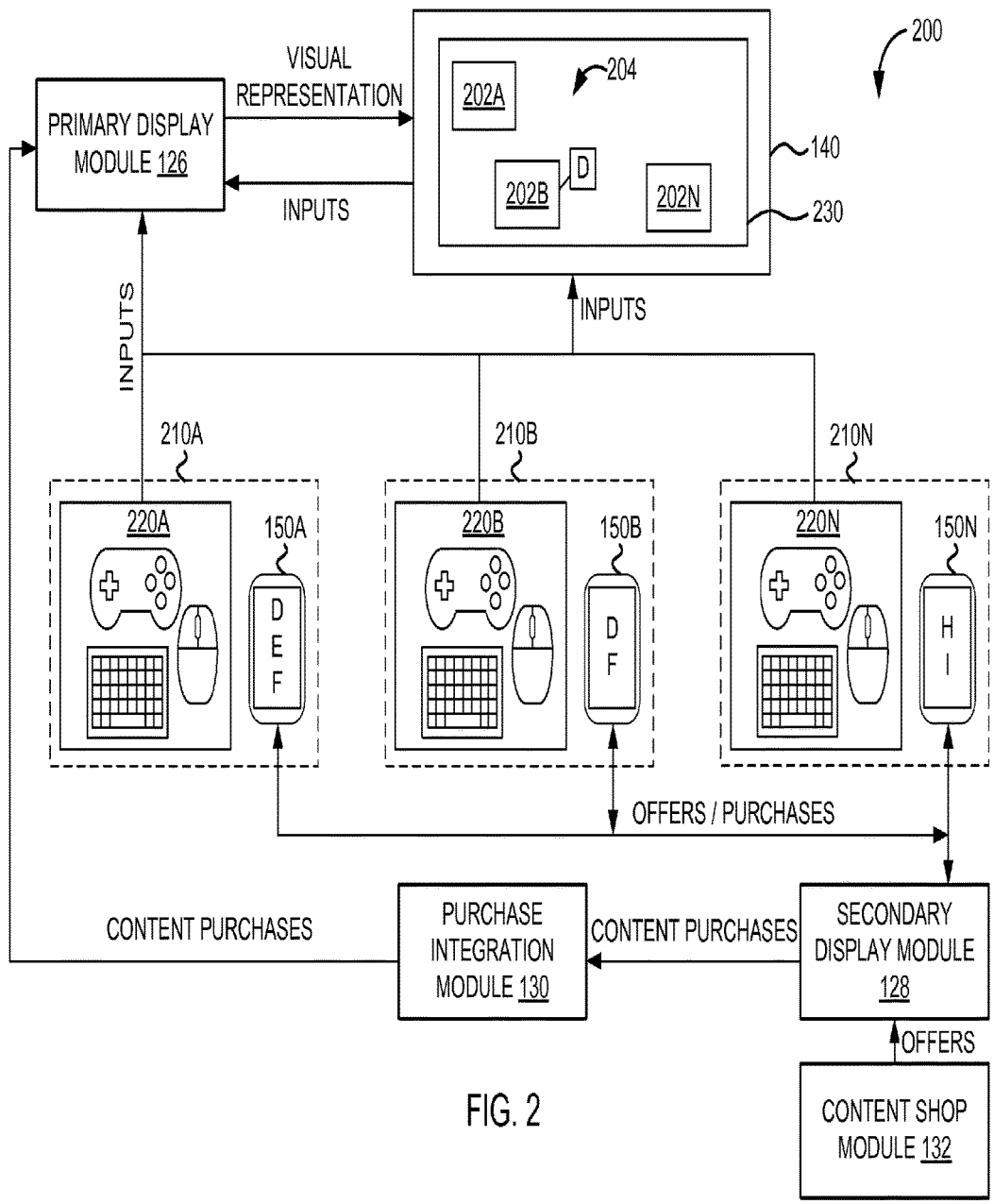
FIG. 2 illustrates an example of a block diagram showing data flows between various components for displaying a game using a primary display and facilitating in-game content purchases using a secondary display, according to an embodiment of the invention.

FIG. 2 illustrates an example of a block diagram 200 showing data flows between various components for displaying a game using a primary display and facilitating in-game content purchases using a secondary display, according to an embodiment of the invention. As illustrated in FIG. 2, one or more input devices 220 (illustrated in FIG. 2 as input devices 220A, 220B, . . . , 220N) and one or more secondary client devices 150 (illustrated in FIG. 2 as secondary client devices 150A, 150B, . . . , 150N) may be operated by respective users 210 (illustrated in dashed boxes 210A, 210B, . . . , 210N). In some embodiments, as illustrated, users 210 may view and interact with game space 204 displayed on a display device 230 of primary client device 140. In some embodiments, users 210 may use their own respective primary client devices 140 to interact with game space 204.

Individual users may control or otherwise interact with one or more respective graphical objects 202 (illustrated in FIG. 2 objects 202A, 202B, . . . , 202N) visually represented in game space 204 of a game. For example, using input device 220A, user 210A may control graphical object 202A. Input signals from input devices 220 may be communicated to primary client device 140 and/or primary display module 126 via one or more wired or wireless communication links.

Using a respective secondary client device 150, such as respective mobile devices, individual users 210 may receive offers for content while playing the game. For example, content shop module 132 may provide the offers to secondary display module 128, which communicates the offers to respective secondary client devices 150 during the game. In some embodiments, content shop module 132 may also provide offers to respective secondary client devices 150 when the game is not being played by the users.

Secondary client devices 150 may include respective display devices such as touchscreens that display the various offers for content (illustrated as letters content "D," "E," "F," "H," and "I"). As illustrated, different secondary client devices 150 may be provided with different offers for content. The different offers may result from targeting different users 210 with different offers. In some embodiments, different secondary client devices 150 may be provided with the same offers for content.

Using a respective secondary client device 150, individual users 210 may provide indications to purchase content based on the offers. For example, user 210B may select an offer for content D via secondary client device 150, which communicates the indication to secondary display module 128. Secondary display module 128 may communicate the indication to purchase to purchase integration module 130, which may cause the purchased content to be reflected in game space 204 where applicable. For example, content D may include a virtual item purchased by user 210B, which may be reflected in graphical object 202B controlled by user 210B.

Figure 3A:
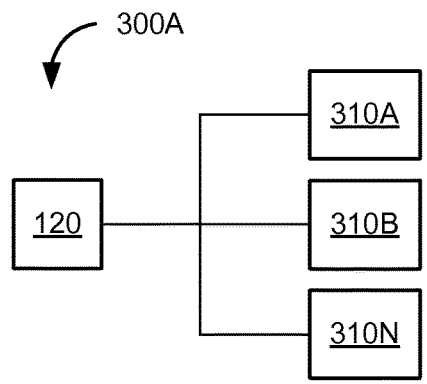
FIG. 3A illustrates a block diagram of multiple architectures for interacting with a game device, according to an embodiment of the invention.

FIG. 3A illustrates a block diagram 300A of multiple architectures for interacting with a game device 120, according to an embodiment of the invention. As illustrated, game device 120 may be communicably coupled to one or more architectures 310 (illustrated in FIG. 3A as architectures 310A, 310B, . . . , 310N) that may individually connect one or more users to game device 120 for playing the game.

Figure 3B:
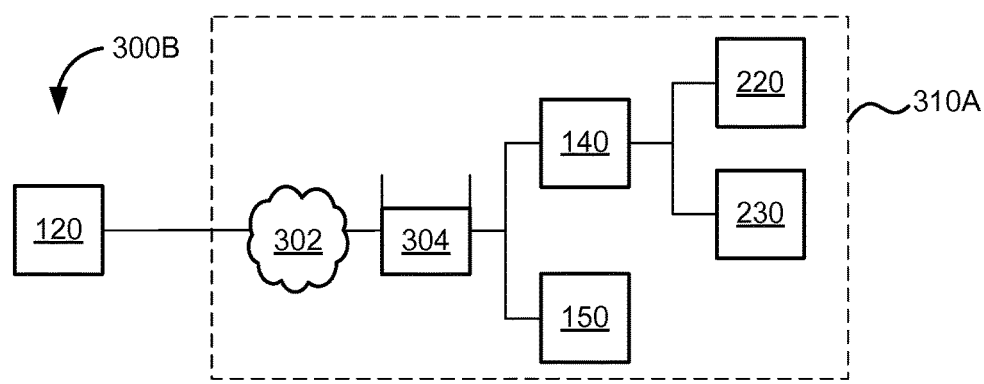
FIG. 3B illustrates a block diagram of a first particular architecture for interacting with the game device, according to an embodiment of the invention.

FIG. 3B illustrates a block diagram 300B of a first particular architecture 310A (illustrated in dashed box) for interacting with game device 120, according to an embodiment of the invention. In the illustrated embodiment, game device 120 may be configured as a networked server device that facilitates online gameplay between one or more users. A particular user or group of users may play the game via primary client device 140 and make purchases using secondary client device 150. One or more primary client devices 140 and one or more secondary client devices 150 may have a wireless or wired connection to one or more routers 304 as well. Router 304 may be communicably coupled with game device 120 via a network 302, which may include one or more networks described herein such as the Internet. Primary client device 150 may include one or more input devices 220 and one or more display devices 230 for displaying the game space.

Figure 3C:
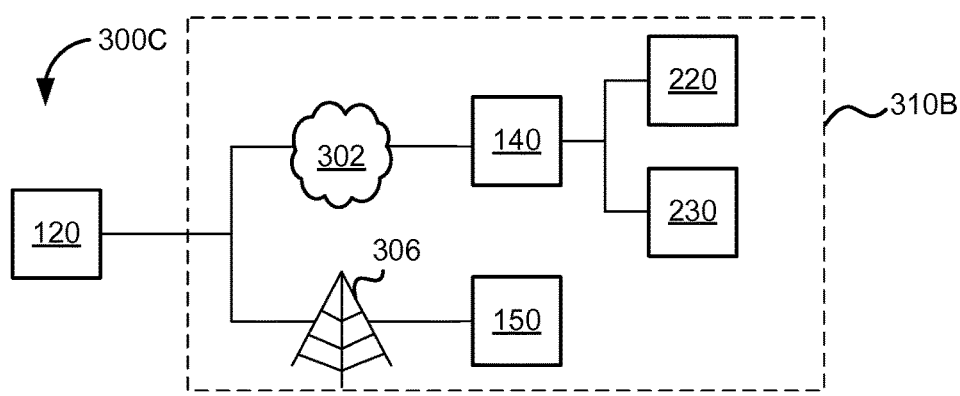
FIG. 3C illustrates a block diagram of a second particular architecture for interacting with the game device, according to an embodiment of the invention.

FIG. 3C illustrates a block diagram 300C of a second particular architecture 310B for interacting with a game device 120, according to an embodiment of the invention. The configuration and architecture 310B is similar to architecture 310A. However, instead of using the same communication channel over network 302 as primary client device 140, secondary client device 150 may use a separate network connection, such as a cellular communications network 306. As illustrated, router 304 is omitted for clarity, although primary client device 140 may connect to network 302 via a router.

Figure 4A:
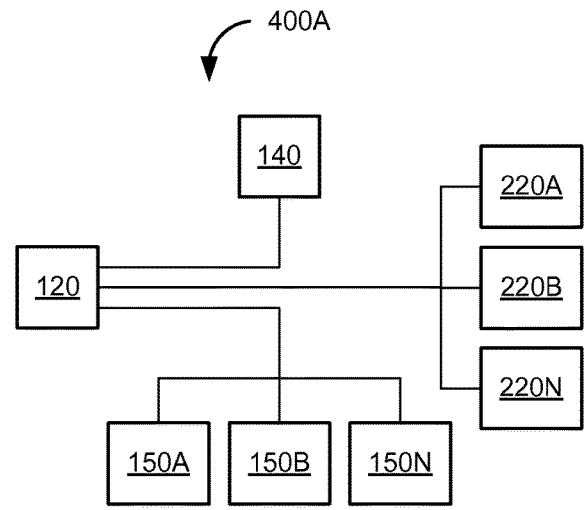
FIG. 4A illustrates a block diagram of an example of a game device locally coupled to a primary client device, one or more input devices, and one or more secondary client devices, according to an embodiment of the invention.

FIG. 4A illustrates a block diagram 400A of an example of a game device 120 locally coupled to one or more primary client devices 140, one or more input devices 220, and one or more secondary client devices 150, according to an embodiment of the invention. In this embodiment, primary client device 140 may include a standalone display device such as a monitor or television set. Game device 120 may provide video and/or audio signals related to the game for displaying on primary client device 140. One or more users may use a respective user input device 220 to interact with the game space displayed by primary client device 140 (which may, for example, be shared among different users in the same room) and a respective secondary client device 150 for making purchases during the game. Thus, users (e.g., in the same room) may be unaware of the purchases made by other users.

Figure 4B:
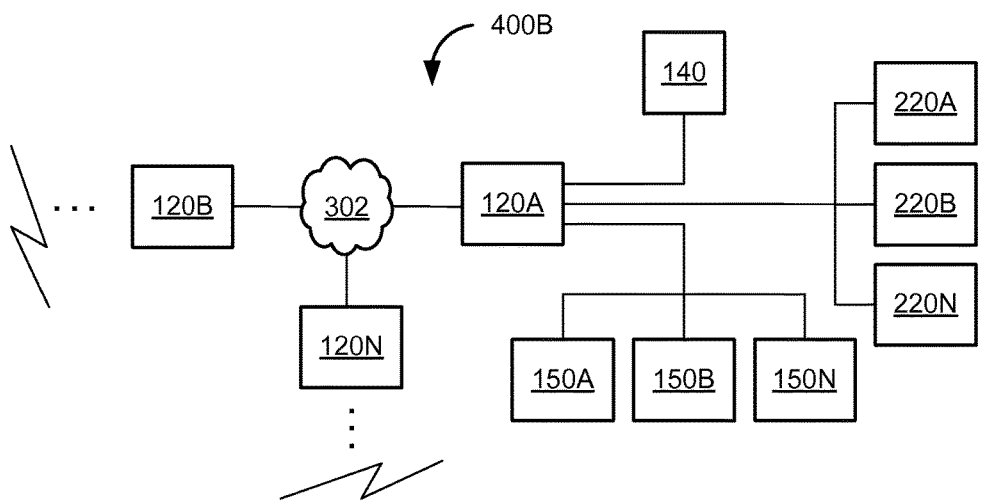
FIG. 4B illustrates a block diagram of an example of game devices coupled to one another over a network and individually being locally coupled to a primary client device, one or more input devices, and one or more secondary client devices, according to an embodiment of the invention.

FIG. 4B illustrates a block diagram 400B of an example of game devices 120 coupled to one another over a network 302 and individually being locally coupled to a primary client device 140, one or more input devices 220, and one or more secondary client devices 150, according to an embodiment of the invention. The configuration illustrated in block diagram 400B is similar to the configuration illustrated in block diagram 400A. However, a game device 120 may be communicably coupled to one or more other game devices 120 over network 302. For example, as illustrated, game device 120A may be coupled to game devices 120B, 120N, which may each have similar configurations of components (omitted from FIG. 4A for convenience and indicated by ellipses) as game device 120A. In this configuration, game devices 120 may form peer-to-peer or other network connections that may be mediated by a server device (not illustrated in FIG. 4A).

Figure 5:
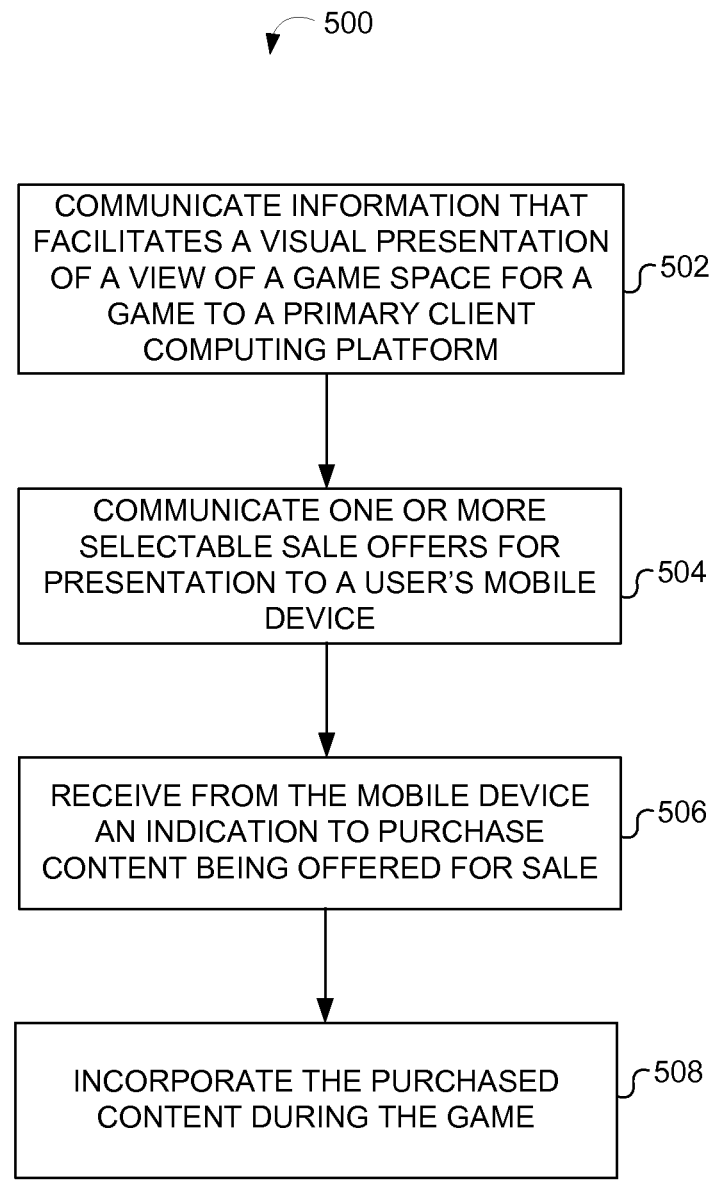
FIG. 5 illustrates an example of a process for facilitating gameplay of a game through a primary display communicated to a primary client device and game-related purchases during the game through a secondary display communicated to a mobile device separate from the primary client device, according to an embodiment of the invention.

FIG. 5 illustrates an example of a process 500 for facilitating gameplay of a game through a primary display communicated to a primary client device and game-related purchases during the game through a secondary display communicated to a mobile device separate from the primary client device, according to an embodiment of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, information that facilitates visual presentation of a view of a game space of a game to the user on a primary client device may be communicated. In an operation 504, one or more selectable sale offers for presentation to the user at a mobile device separate from the primary client device may be communicated. The one or more selectable sale offers may be for content in the game and may be presented during the game.

In an operation 506, an indication to purchase at least one content being offered for sale during the game may be received from the mobile device. In an operation 508, the at least one content may be integrated into the game responsive to the indication to purchase. The purchased content may be integrated into the game during the game such that communication of the game space for visual presentation of the game to the user on the primary client device incorporates the at least one content.

Figure 6:
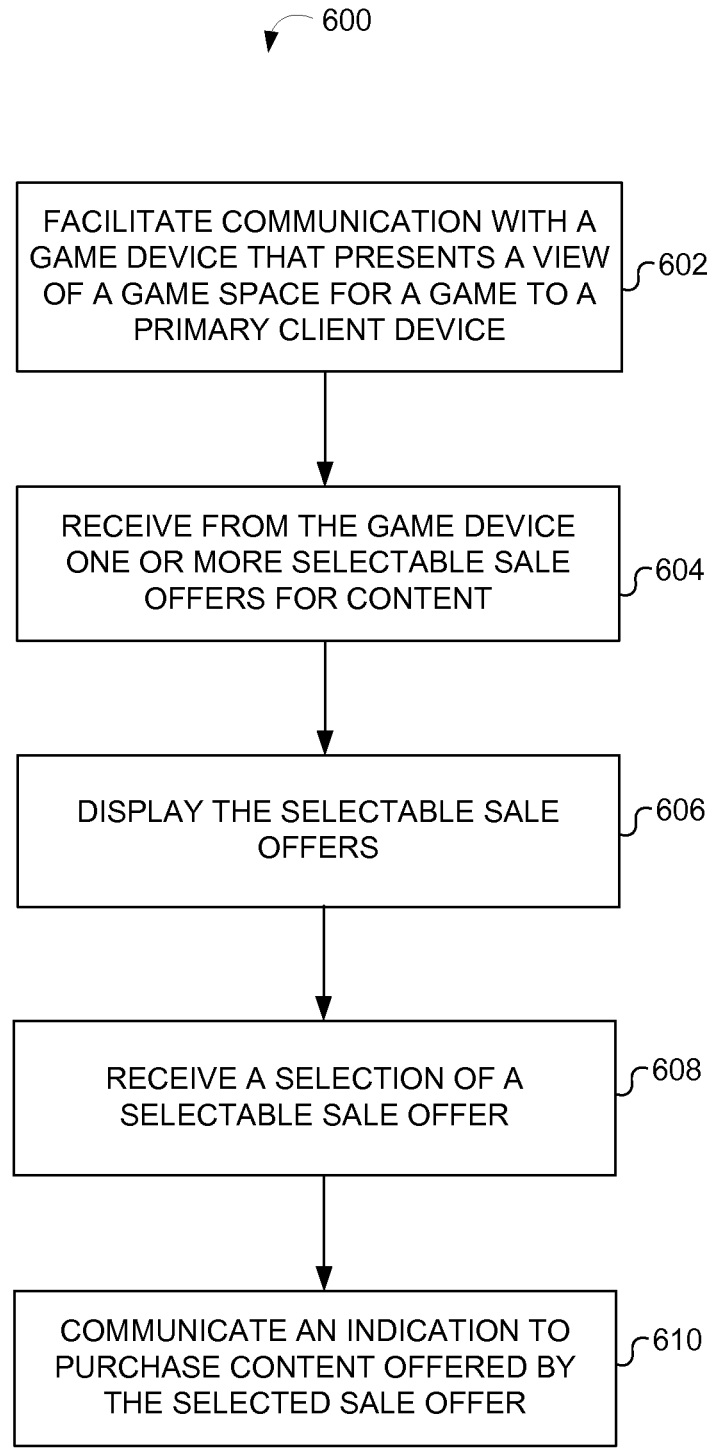
FIG. 6 illustrates an example of a process for receiving an offer during display of a game space and indicating purchase information responsive to the offer, according to an embodiment of the invention.

FIG. 6 illustrates an example of a process 600 for receiving an offer during display of a game space and indicating purchase information responsive to the offer, according to an embodiment of the invention. In an operation 602, communication with a game device that presents a view of a game space for a game to a primary client device may be facilitated. For example, a secondary client device such as a mobile device may logon or otherwise provide identifying information to the game device so that the game device may associate the secondary client device with a user who is playing or will play the game via the primary client device.

In an operation 604, one or more selectable offers for content may be received from the game device during the game (e.g., while the user is playing the game via the primary client device). The content offered for sale may be usable in the game.

In an operation 606, the selectable offers may be displayed on the secondary client device. In an operation 608, a selection of one or more of the selectable offers may be received at the secondary client device. In an operation 610, the indication to purchase may be communicated to the game device such that the content may be integrated into the game.

Figure 7:
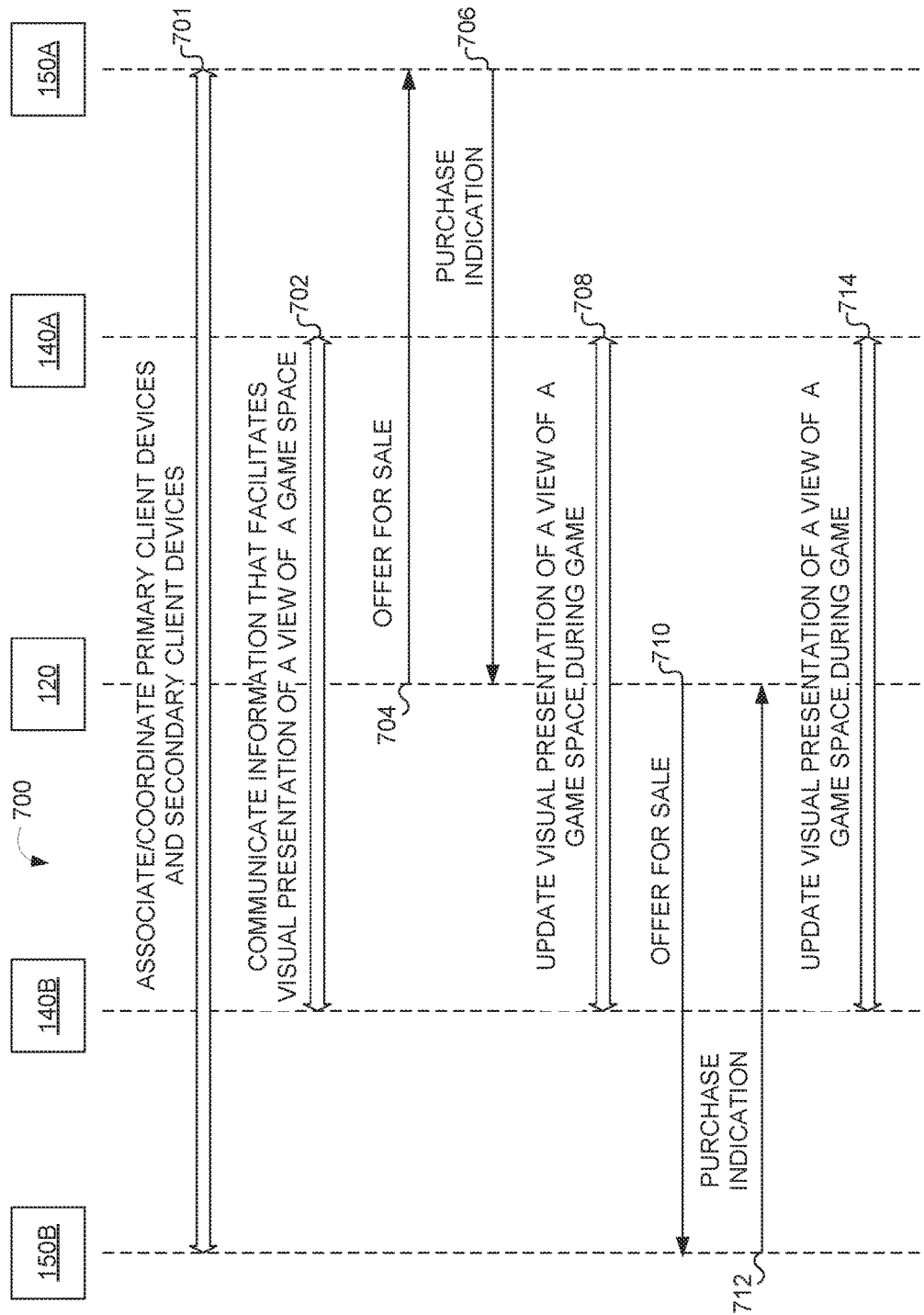
FIG. 7 illustrates an example of a process for providing a primary display that includes a game space and a secondary display that facilitates sale of content, according to an embodiment of the invention.

FIG. 7 illustrates an example of a process 700 for providing a primary display that includes a game space and a secondary display that facilitates sale of content, according to an embodiment of the invention. In an operation 701, game device 120 may coordinate or otherwise associate one or more primary client devices 140 and one or more secondary client devices 150 for gameplay on the primary client devices and purchases for the game on secondary client devices. For example, users may logon using their respective secondary client devices so that game device 120 may associate the secondary client device used by a user with the user's gameplay session.

In an operation 702, game device 120 may communicate information that facilitates visual presentation of a view of a game space to primary client devices 140. In an operation 704, game device 120 may communicate one or more selectable offers to secondary client device 150A. In an operation 706, a user of secondary client device 150A may select at least one of the selectable offers. Responsive to the selection, secondary client device 150A may provide an indication to purchase content to game device 120. In an operation 708, game device 120 may update the visual presentation of a view of the game space during the game to reflect the purchased content. In an operation 710, game device 120 may communicate one or more selectable offers to secondary client device 150B. In an operation 712, a user of secondary client device 150B may select at least one of the selectable offers. Responsive to the selection, secondary client device 1508 may provide an indication to purchase content to game device 120. In an operation 714, game device 120 may update the visual presentation of a view of the game space during the game to reflect the purchased content.

Although described with respect to video games, the disclosure may be used in other contexts in which a virtual space may be expressed at a primary client device and purchases may be made via a secondary client device during expression of the virtual space. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A primary client device that facilitates game play through the primary client device and acceptance of game-related content offers through a mobile device separate from the primary client device, the primary client device comprising:
    one or more processors configured by machine-readable instructions to:
        effectuate presentation of a view of a game space via a primary display connected to or associated with the primary client device, wherein an online game is played within the game space, and wherein game events occur during the online game within the game space;
        facilitate pairing of the mobile device and the primary client device via a local wireless or wired communication channel such that the mobile device and the primary client device are communicably coupled;
        communicate one or more selectable content offers for presentation to the user via the mobile device, the mobile devices being separate from the primary display through which the game space is presented and from the primary client device, the one or more selectable content offers being offers for content in the online game that are presented by the mobile device, the one or more selectable content offers being identified for communication to the mobile device based on game events in the online game, wherein such communication is enabled by the pairing of the mobile device and the primary client device via the local wireless or wired communication channel;
        receive, from the mobile device, information indicating acceptance of at least one content offer; and
        effectuate incorporation of content from the at least one content offer that was accepted into the online game.

2. The primary client device of claim 1, further comprising:
    a content database comprising content available for inclusion within selectable content offers; and
    wherein the one or more processors are further configured by machine-readable instructions to identify content to offer based on game events in the online game, wherein the one or more selectable content offers offers include the identified content.

3. The primary client device of claim 2, wherein the one or more processors are further configured by machine-readable instructions to:
    receive a request during the online game from the mobile device to provide the one or more selectable content offers.

4. A computer-implemented method of facilitating gameplay of an online game through a primary client device and acceptances of game-related content offers through a mobile device separate from the primary client device, the method being implemented in the primary client device, the primary client device including one or more processors configured by machine-readable instructions, the method comprising:
    effectuating, by the one or more processors, visual presentation of a view of a game space via a primary display, wherein the online game is played within the (lame space, and wherein game events occur during the online game within the game space;

facilitating, by the one or more processors, pairing of the mobile device and the primary client device via a local wireless or wired communication channel such that the mobile device and the primary client device are communicably coupled;

communicating, by the one or more processors, one or more selectable content offers for presentation to the user via the mobile device, the mobile device being separate from the primary display through which the game space is presented and from the primary client device, the one or more selectable content offers being offers for content in the game that are presented by the mobile device, the one or more selectable content offers being identified for communication to the mobile device based on (lame events in the online (lame, wherein such communication is enabled by the pairing of the mobile device and the primary client device via the local wireless or wired communication channel; and receiving, at the one or more processors, from the mobile device, information indicating acceptance of at least one content offer; and effectuating incorporation of content from the at least one content offer that was accepted into the online game.

5. The computer-implemented method of claim 4, further comprising:

storing, by a content database, content available for inclusion within selectable content offers; and identifying, by the one or more processors, content to offer based on game events in the online game, wherein the one or more selectable content offers include the identified content.

6. The computer-implemented method of claim 5, the method further comprising:

receiving, by the one or more processors, a request during the online game from the mobile device to provide the one or more selectable content offers.

7. The primary client device of claim 1, wherein the one or more selectable content offers are communicated such that the one or more selectable content offers are presented to the user via the mobile device while the user is not currently playing the online game on the primary client device.

8. The primary client device of claim 1, wherein the one or more selectable content offers are communicated such that the one or more selectable content offers are presented to the user via the mobile device while the user is currently playing the online game.

9. The computer-implemented method of claim 4, wherein the one or more selectable content offers are communicated such that the one or more selectable content offers are presented to the user via the mobile device while the user is not currently playing the online game on the primary client device.

10. The computer-implemented method of claim 4, wherein the one or more selectable content offers are communicated such that the one or more selectable content offers are presented to the user via the mobile device while the user is currently playing the online game.

\* \* \* \* \*

UNITED STATES PATENT AND TRADEMARK OFFICE
CERTIFICATE OF CORRECTION

PATENT NO. : 10,430,844 B1
APPLICATION NO. : 15/664950
DATED : October 1, 2019
INVENTOR(S) : Kent Wakeford et al.

It is certified that error appears in the above-identified patent and that said Letters Patent is hereby corrected as shown below:

In the Specification

In Column 8, Line 56, change "1508," to --150B,--.

In Column 9, Line 61, change "3108" to --310B--.

In Column 9, Line 63, change "3108" to --310B--.

In Column 11, Line 57, change "1508" to --150B--.

In the Claims

In Column 12, Line 50, Claim 2, change "offers offers" to --offers--.

Signed and Sealed this
Seventh Day of January, 2020

Andrei Iancu
*Director of the United States Patent and Trademark Office*